Feb. 28, 1967     D. C. W. T. SHARP ETAL     3,307,165
SYNCHRONOUS ELECTRICAL TRANSMISSION SYSTEMS
Filed July 6, 1964     2 Sheets-Sheet 1
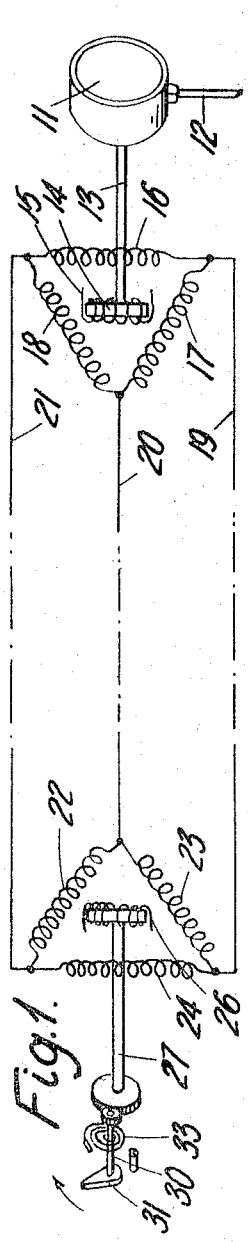
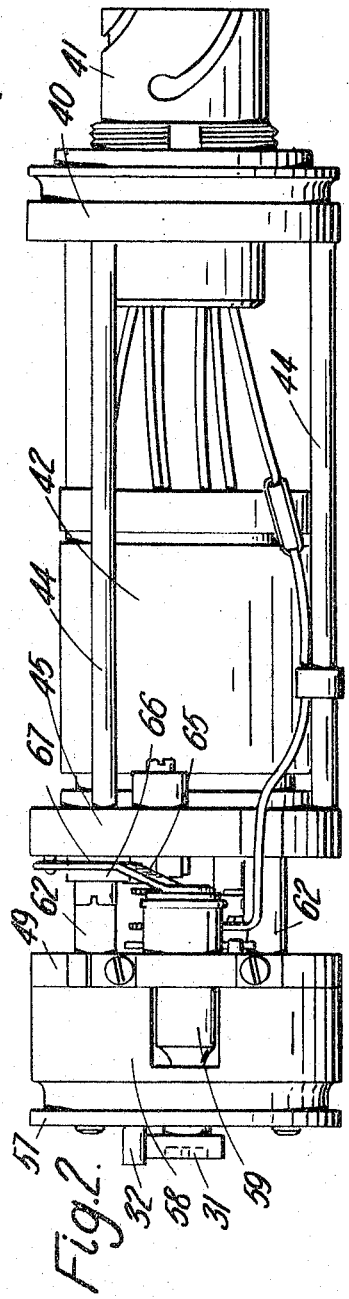
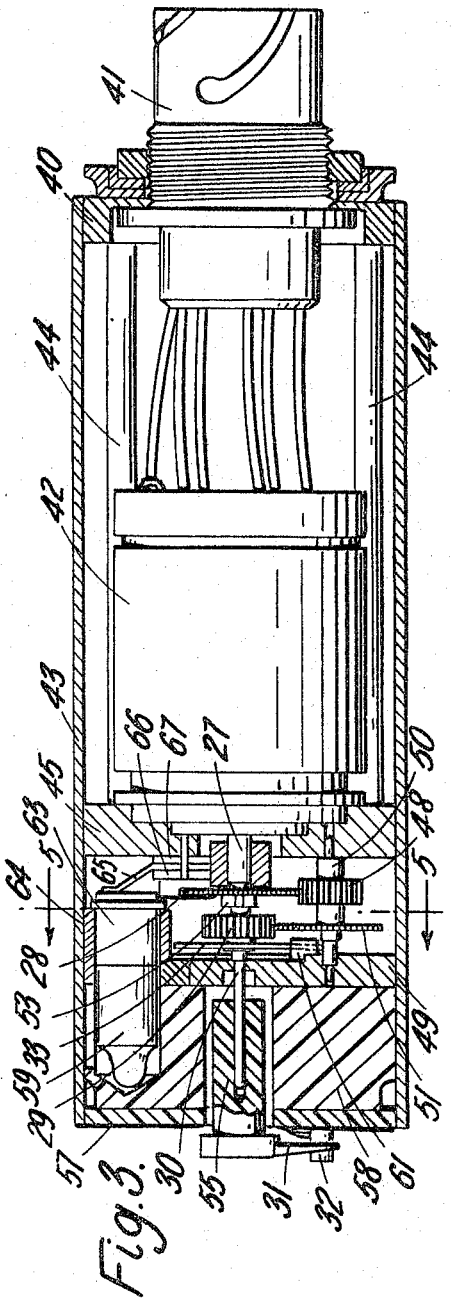

3,307,165
SYNCHRONOUS ELECTRICAL TRANSMISSION SYSTEMS
Douglas Cecil William Thomas Sharp and Herbert Clifford Rowton Seal, both of Basingstoke, England, assignors to Appleby & Ireland Limited, Basingstoke, England, a British company
Filed July 6, 1964, Ser. No. 380,482
Claims priority, application Great Britain, July 1, 1964, 26,617/64
6 Claims. (Cl. 340—198)

This invention comprises improvements in or relating to synchronous electrical transmission systems.

It is known to provide for remote indication of the readings of instruments by means of synchronous electrical transmission systems in which the instrument, which may be a pressure gauge or a volt meter or any other instrument for measuring a quantity of any kind, serves to operate a rotor on a transmitting device which is electrically connected, usually by three wires like the wires of a three-phase electrical transmission, to a winding on a receiver which operates a rotatable operated member which gives at a remote station an indication of the position of the instrument. The rotor windings are supplied usually with alternating current at a frequency of the order of 400 cycles per second.

Two difficulties arise with transmission systems of this kind: In the first place, if the current supply fails the operated member of the receiver may get out of synchronism with the rotatable member of the transmitting instrument, particularly in the case of receivers with spring bias to zero. In the second place, if the quantity to be measured, such as say hydraulic pressure or electrical voltage fails and the instrument which is transmitting the signals falls to zero, the operated member of the receiver will return to zero. If the receiver is spring biased and current fails in the transmission, it will also return to zero. It is thus not possible for the person who reads the instrument to determine from the position of the operated member whether the zero reading is the result of failure of current in the transmission system or of a fall to zero in the supply of the initial quantity (pressure or the like) which is to be measured. If the receiver has no spring to urge it to zero, then, in the event of an electrical failure, the receiver will stay at the position it held before the failure and it will not always be apparent that the indicated reading is false. Thus for example on an aircraft, it becomes difficult to distinguish between a failure of the electrical system and a failure of the hydraulic pressure to work say an undercarriage and it may be vital for the operator to know the difference.

Another fault is that with the ordinary three-phase synchronous transmission which has been referred to, if the receiving instrument (having no spring bias) passes the mid point of its travel and there is a failure of current for the transmission, when the pressure or the like has dropped, if power is restored indicating pointer will return to zero by the shortest route (i.e. it will move forward toward zero instead of backward) and it will come hard up against the wrong side of the zero stop. Likewise a receiving instrument with spring return will return to zero after an electrical failure, but will try to pass through the end stop to the maximum position when power is restored thus giving a false zero reading.

It is an object of the present invention to overcome these difficulties.

According to the present invention, a remote electrical indicating system for instrument readings comprises in combination a transmitter having a wound polar rotor and a polyphase stator, operating means connecting the rotor to the movable part of the instrument the reading of which is to be transmitted, the connection being such that the rotor moves through less than 180 electrical degrees between instrument zero and instrument maximum, transmission lines from the stator, a receiver having a stator connected to the transmission lines, a wound polar rotor, a multiplying gear operated by the rotor, an indicator operated by the multiplying gear, a return spring to urge the indicator back to zero, and a stop to limit the return movement, the position of which stop differs from the position indicating instrument zero.

The effect of the introduction of spring return and a multiplying gear into the combination and of the limitation of rotation of the transmitter to less than 180° and of the positioning of the stop on the receiver is, that the operated member of the electrical portion of the receiver never moves as far as its mid point of movement and in the event of a failure of the current supply the needle or other movable indicating member will always return back to zero and will not move forward to maximum.

Also as the indicating member and gear are spring urged towards a starting position to which they return when current fails, which zero is different from the zero indication of the indicating member, the zero against the stop which represents a failure of current supply is different from the zero position of the instrument which represents zero of the quantity as measured by the instrument. The operator can therefore distinguish at once between a failure of the transmission energy and a failure of the quantity being measured.

The following is a description, by way of example, of one construction in accordance with the invention:

In the accompanying drawings—

FIGURE 1 is a diagram of the system;

FIGURE 2 is a plan of a receiving instrument when removed from its case;

FIGURE 3 is a side elevation of the same, partly in section;

Figure 4:
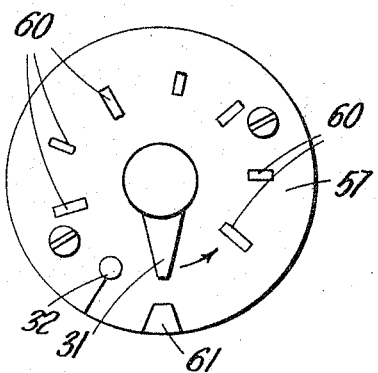
FIGURE 4 is a face view of the dial as viewed from the left of FIGURE 3.

Referring to FIGURE 1, an instrument 11 which may be a pressure gauge connected by a pipe 12 to a source of pressure, instead of operating a pointer operates a spindle 13 on which is mounted a bi-polar rotor 14 carrying a winding 15 which is connected with an electricity supply (not shown) consisting of alternating current at a frequency of about 400 cycles per second. The rotor 14 operates in magnetic relation to a three-phase winding on a stator which is indicated diagrammatically by the three-phase windings 16, 17, 18 which are shown joined in delta connection with each other. The stator windings are connected by three transmission lines 19, 20, 21 to similar stator windings 22, 23, 24 on a receiver. The receiver has a rotor 25 similar to the rotor 14 and likewise supplied with high frequency alternating current on its winding 26. As long as the current supply is maintained the two rotors 14 and 25 will move in synchronism with one another and the rotor of the receiver operates a spindle 27 which is connected by a multiplying gear 28, 29 to the spindle 30 of a pointer 31. There is a zero stop 32 in the path of the pointer 31 and the mechanism is urged to return the pointer to zero by a spring 33.

Owing to the stop 32 the pointer 31 can never make more than one revolution and consequently owing to the multiplying gear 28, 29 the rotor 25 can never make as much as one half of a revolution. The pressure gauge 11 is so designed that the spindle 13 always moves through an angle of less than half a revolution corresponding to what is possible for the rotor 25. The position of the spindle 13 at zero pressure is made such that the pointer 31, when the rotors 25 and 14 are in synchronism with each other, will not be hard back against the stop 32 but will be spaced from it a little. When the apparatus is in operation the pointer 31 will show the position of the spindle 13 but to a magnified scale in degrees of movement, the transmission operating through the transmission lines 19, 20, 21, serving to keep the rotor 25 in synchronism with the rotor 14 as long as current supply continues. The three-phase transmission itself being well-known need not be herein further described.

In the event of a failure of current the rotor 25 will no longer be held in synchronism with the rotor 14 and the pointer 31 will be returned by the spring 33 until it engages the stop 32. As the position of the stop 32 differs from the position corresponding to zero pressure the operator can see at once that the movement is due to a current failure. On resumption of current supply, in as much as neither of the rotors 14 and 25 have moved through an arc corresponding to as much as 180°, the rotor 25 will automatically move into synchronism with the rotor 14 in a forward direction away from the stop 32 and correct readings will be resumed. If there were no spring 33 or if the movement of the rotor 25 exceeded 180°, (a) on failure of current the pointer 31 would not return against the stop 32, and (b) on resumption of current if the rotor 25 had moved more than 180° it would tend to synchronise itself by moving forward into synchronism but owing to the fact that it is designed to move through less than 180° (although moving the pointer 31 through an arc which may be as much as nearly 360°) this incorrect forward movement into synchronism cannot occur.

The apparatus according to the present invention therefore indicates correctly at all times and differentiates to the operator between a zero indication which is due to failure of current and a zero indication which is due to a failure of pressure.

The practical construction of the receiver is shown in FIGURES 2 to 5.

It comprises a base 40 with a bayonet-type connector 41 to an electrical circuit (the transmission lines 19, 20, 21 of FIGURE 1) and the connector is linked by appropriate connections to a three-phase motor unit 42 which constitutes the stator of the receiving instrument. All these parts are enclosed in a metal tubular case 43 (shown in section in FIGURE 3), one end of which butts on the base 40. The base 40 is connected by posts 44 with a second parallel plate 45 like the two plates of a clock. A rotor (not seen in the figures) works within the stator 42 in the tubular metal case and has a spindle 27 (FIGURE 3) which corresponds to spindle 27 of FIGURE 1, and projects through the plate 45 concentrically with the case and carries gear wheel 28. The gear wheel 28 meshes with a pinion 48 pivoted between the plate 45 and a second plate 49. The pinion spindle 50 carries a gear wheel 51 which, in turn, meshes with a second pinion 29 (corresponding to 29, FIGURE 1) concentric with the spindle 27 of the rotor. The rotor spindle 27 carries a cap 53 and the spindle 30 of the pinion 52 is provided at one end with a bearing in the cap. At the other side of the pinion it has a bearing in the outer plate 49 of the mechanism and it extends through this bearing and in front of it carries a translucent cylinder 55 which bears the pointer 31.

The pointer 31 moves over a fixed scale on a dial 57. The dial is separated from the outer plate 49 of the mechanism by a block 58 of a light transmitting material, such as poly-methyl-methacrylite and the translucent shank 55 of the pointer 31 where it fits over the end of the second pinion spindle, is surrounded by the block 58. An electric lamp bulb 59 is let into the block 58 which separates the dial from the plate 49 of the mechanism and the light of the lamp is transmitted and diffused by the block 58 so that it illuminates the dial and also penetrates into the translucent shank 55 of the pointer. The dial 57 is made of translucent material which is blacked over and the black covering is cut away to show illuminated markings 60 (FIGURE 4). The pointer 31 is of translucent material like its shank and the whole of the pointer is in this way illuminated and shows up against the black face of the dial 57. There is an illuminated zero mark 61 at the position which corresponds to zero pressure in the instrument 11. The stop 32, as will be noted, is further back in the path of the pointer 31.

Figure 5:
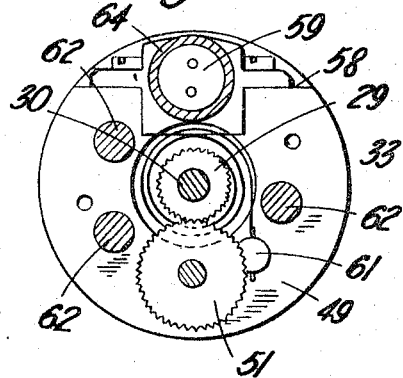
FIGURE 5 is a section upon the line 5—5 of FIGURE 3 looking in the direction of the arrows.

The spindle 30 is turned towards the stop 32 by hairspring 33 which can be seen in FIGURES 3 and 5 of the drawings. The hairspring is anchored at its inner end to the spindle 30 and at its outer end to a post 61 in the plate 49. Posts 62 serve to space apart the plates 45, 49.

The electric lamp 59 has a metallic base 63 which fits in a socket 64 connected to one pole of an electrical supply and it has an insulated end terminal which receives current through a spring 65 held between insulating blocks 66, 67.

The multiplying gearing which is constituted by the the gear wheels 28, 51 and pinions 48, 29 above described, has a ratio of approximately 3:1 and therefore a movement of the rotor spindle 27 of about one third of a turn will rotate the pointer 31 through nearly 360°; thus, a movement of the synchronous rotor of the instrument of about one third revolution (in point of fact it is made slightly more than one third) will rotate the pointer through nearly one revolution. The result of this mechanism is, in operation, that the rotor 25 of the receiver never rotates more than one third of a revolution and therefore never gets to a position in which, after a failure of the current supply, when the hydraulic pressure is reduced and electrical power restored, it would tend to take the shortest route back to its zero by moving onward. The shortest route to zero is always backward. There is therefore no risk of the pointer 31 becoming out of synchronism with the position of the driving rotor 14 of the transmitter instrument by getting on the wrong side of stop 32. Secondly owing to the hairspring 33 and stop 32, the zero at 61, representing a failure in the primary quantity to be measured will occupy a different position from the zero (against stop 32) representing the point to which the pointer 31 will return in the event of a failure of transmission current.

Thus, the person reading the instrument can always distinguish between a failure of current supply and a failure of the primary quantity, such as pressure, and the instrument will remain accurately synchronised under all conditions.

We claim:

1. A remote electrical indicating system for instrument readings, comprising in combination a transmitter having a wound polar rotor and a polyphase stator, operating means connecting the rotor to the movable part of the instrument the reading of which is to be transmitted, the connection being such that the rotor moves through less than 180 electrical degrees between instrument zero and instrument maximum, transmission lines from the stator, a receiver, having a stator connected to the transmission lines, a wound polar rotor, a multiplying gear operated by the rotor, an indicator operated by the multiplying gear, a return spring to urge the indicator back to zero, and a stop to limit the return movement, the position of which stop differs from the position indicating instrument zero.

2. A receiver for a system as claimed in claim 1, comprising a wound polyphase stator, a polar rotor in magnetic relation thereto, a scale and pointer in rotatable relation to each other, a multiplying gear connecting the rotor to the rotatable member of the scale and pointer, a return spring for the rotated member, a stop to limit movement under the effect of the return spring, the stop being located at a different point from that which corresponds to zero of the indicated quantity.

3. A receiver as claimed in claim 2 wherein the multiplying gear comprises a side-shaft parallel with the axis of the rotor, a gear wheel on the rotor meshing with a pinion on the side-shaft, and a gear wheel on the side-shaft meshing with a pinion in a spindle which carries the rotatable member of the scale and pointer, the axis of the said rotatable member being coaxial with the rotor.

4. A receiver as claimed in claim 2 wherein the scale is fixed and the pointer is the movable member.

5. A receiver as claimed in claim 4 wherein the pointer has a spindle made of translucent material and passes through the centre of the scale, behind the scale is a block of translucent material surrounding the spindle of the pointer and in said block is a light source, whereby scale and pointer are both illuminated.

6. A receiver comprising in combination a polyphase stator, a two-pole rotor rotatably mounted within the same, a gear wheel concentric with and attached to the rotor, a side-shaft parallel with the rotor axis, a pinion thereon meshing with the gear wheel, a second gear wheel on the side-shaft, a spindle coaxial with the rotor, a second pinion thereon meshing with the gear wheel on the side shaft, a translucent extension of said spindle, a pointer on the translucent extension, a translucent block around the translucent extension, a light source in the block, scale carried by the block in relation to the pointer, a return spring for the pointer and a stop on the block to prevent the pointer moving beyond a certain point under the influence of the return spring, said stop being located at a different point from zero on the scale.

References Cited by the Examiner
UNITED STATES PATENTS 2,239,790  4/1941  Kollsman _____ 318—23
2,393,189  1/1946  Richmond _____ 318—24

NEIL C. READ, *Primary Examiner.*

T. B. HABECKER, *Assistant Examiner.*